United States Patent [19]

Sachs

[11] 3,960,461
[45] June 1, 1976

[54] DROP WIRE CLAMPS

[76] Inventor: Isaac Sachs, 2685 Kent Ave., Montreal, H33 1M8, Quebec, Canada

[22] Filed: Apr. 7, 1975

[21] Appl. No.: 565,687

[52] U.S. Cl. .............................. 403/368; 403/374; 24/136 L; 24/115 M; 339/103 R
[51] Int. Cl.² .......................................... F16G 11/04
[58] Field of Search .......... 24/136 R, 136 L, 115 M; 403/374, 368; 339/103 R, 273 R, 273 F

[56] References Cited
UNITED STATES PATENTS

| | | | |
|---|---|---|---|
| 1,001,054 | 8/1911 | Lawrence | 24/136 L |
| 1,020,728 | 3/1912 | Talbot | 24/136 L |
| 1,293,559 | 2/1919 | Scott | 24/136 L |
| 1,362,781 | 12/1920 | Chase | 24/136 L |
| 1,389,859 | 9/1921 | Chronister | 24/115 M |
| 2,068,368 | 1/1937 | Bovier | 24/136 R |
| 2,076,359 | 4/1937 | Bay | 24/136 R |
| 2,546,534 | 3/1951 | Znidarsic | 24/115 M |
| 2,650,129 | 8/1953 | Axelsen | 403/368 |
| 2,913,791 | 11/1959 | Martin | 24/115 M |
| 3,048,908 | 8/1962 | Bryan | 24/136 L |

FOREIGN PATENTS OR APPLICATIONS

| | | | |
|---|---|---|---|
| 460,649 | 10/1949 | Canada | 24/136 R |
| 611,412 | 12/1960 | Canada | 24/136 R |
| 696,375 | 10/1964 | Canada | 24/136 R |

*Primary Examiner*—Bernard A. Gelak
*Attorney, Agent, or Firm*—Raymond A. Robic; Arthur Schwartz; Louis Allahut

[57] ABSTRACT

A drop wire and/or cable clamp to provide a predetermined tension in a wire and/or cable between said clamp and a building to which said wire and/or cable is connected at one end and to produce a loose portion between said clamp and a box to which said wire and/or cable is connected at the other end. This clamp comprises a conical member, and a conical sleeve for mounting over the conical member. The clamp will be arranged for axially clamping the wire between the conical member and the conical sleeve and it will be possible to fix the conical member adjacent the box, with the conical sleeve mounted thereover and the wire therebetween. The net result will be to produce a loose portion in the wire or cable which has been installed between the box and the drop wire and/or cable clamp, and at the same time to obtain the portion under tension between the clamp on the building.

17 Claims, 10 Drawing Figures

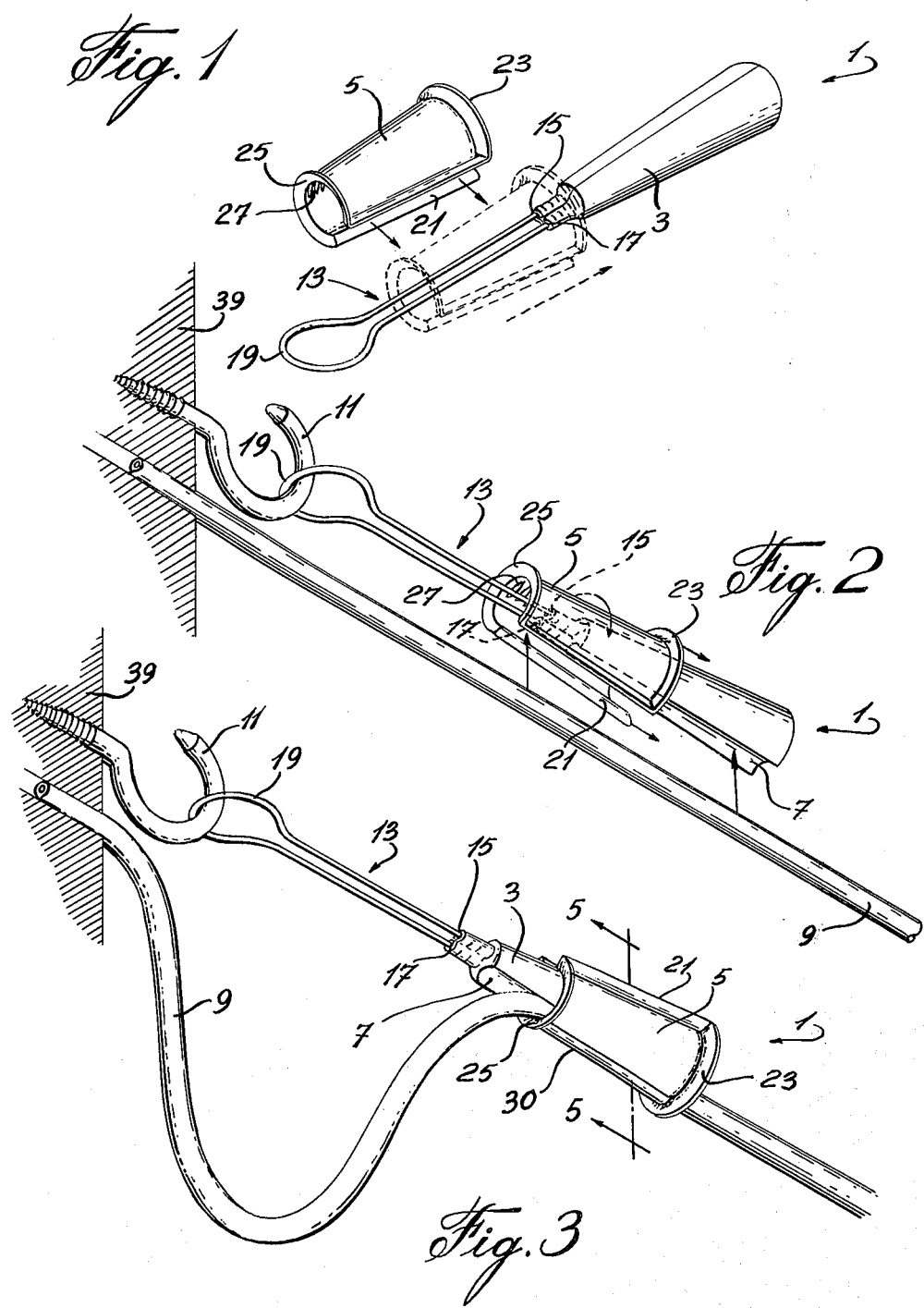

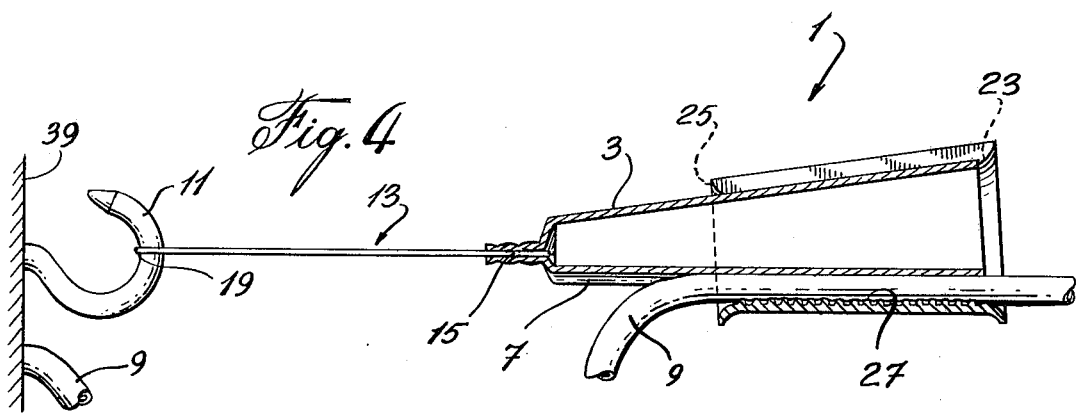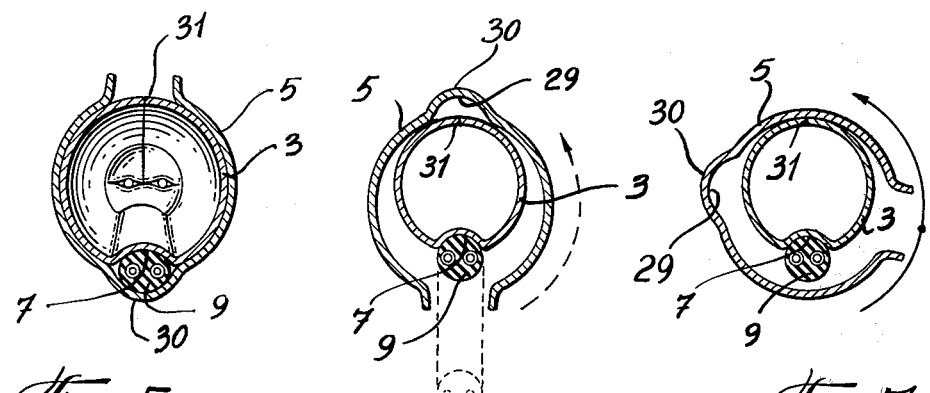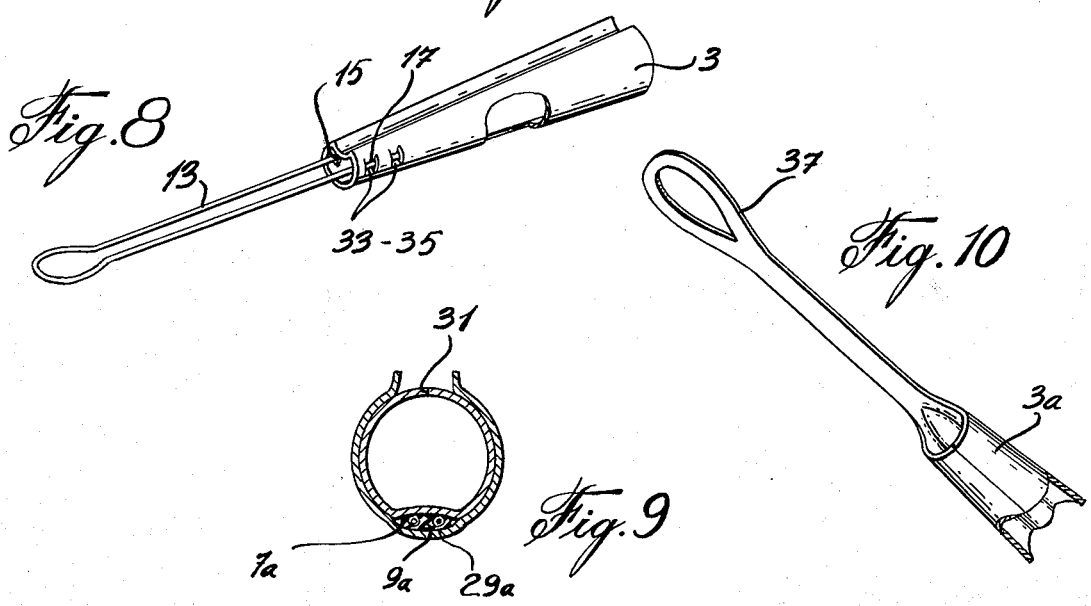

DROP WIRE CLAMPS

This invention relates to a drop wire and/or cable clamp. More particularly, the present invention is directed to a device of the drop cable or drop wire clamp type which is used to provide a predetermined tension in a wire and/or cable between said clamp and a building to which said wire and/or cable is connected at one end and to produce a loose portion between said clamp and a box to which said wire and/or cable is connected at the other end.

When connecting a wire or a cable, and more particularly a coaxial television cable of the type which is most commonly used by the so called cable TV industry, the technician who has to install such a cable is forever faced with the problem of providing a predetermined tension in the wire and/or cable between the clamp and a building to which the wire and/or cable is connected at one end and of producing a loose portion between the clamp and a box to which the wire and cable is connected at the other end. For example, when a connection is made between a junction along the transmitting line and a house or a residence, after the operation is terminated, the technician must find some way of rigidifying the cable, while at the same time accumulating a loose portion near the connecting box. Although all kinds of device and gadgets are available, it has not been possible, to this day, to rely on a device which is simple to operate, and easy to install while at the same time being inexpensive.

In order to overcome the above disadvantages, I have invented a drop wire and/or cable clamp to provide a predetermined tension in a wire and/or cable between said clamp and a building to which said wire and/or cable is connected at one end and to produce a loose portion between said clamp and a box to which said wire and/or cable is connected at the other end. This clamp comprises a conical member, and a conical sleeve for mounting over the conical member. The clamp will be arranged for axially clamping the wire between the conical member and the conical sleeve and it will be possible to fix the conical member adjacent the box, with the conical sleeve mounted thereover and the wire therebetween. The net result will be to concentrate the looseness present in the wire or cable which has been installed, between the box and the drop wire clamp.

In the drawings which illustrate the invention,

FIG. 1 is a perspective view of a clamp according to the present invention showing the mounting of the conical sleeve;

FIG. 2 illustrated, in perspective view, the hooking of the clamp according to the invention before axially inserting a cable therein;

FIG. 3 is a perspective view of the same device when mounted, also showing the loose portion of the cable which has been accumulated between the clamp and the box;

FIG. 4 is a longitudinal cross-section view through the clamp illustrated in FIGS. 1, 2 and 3;

FIG. 5 is a section taken along line 5—5 of FIG. 3,

FIG. 6 is a cross-section view of another embodiment in the initial position;

FIG. 7 is a view of the same clamp in the intermediate position thereof;

FIG. 8 is a perspective view of another embodiment of the conical member;

FIG. 9 is a transverse cross-section view of an embodiment similar to that illustrated in FIGS. 6 and 7 but adapted for clamping a substantially flat cable;

FIG. 10 is a perspective view of yet other embodiment of conical member.

Referring now to the drawings, more particularly to the embodiment illustrated in FIGS. 1, 2, 3 and 4, the drop wire and/or cable clamp 1 illustrated therein will be seen to comprise two main elements, namely a conical member 3 and a conical sleeve 5 the latter being generally shaped for mounting over the conical member 3. As illustrated, the conical member 3 is provided with an outer longitudinal groove 7 which will serve to engage the wire or coaxial TV cable 9 when the conical sleeve 5 is mounted over the conical member 3 and the outer longitudinal groove 7 in the particular manner illustrated in FIG. 3 of the drawings.

As illustrated in FIGS. 1, 2, 3 and 4, the conical member 3 is hollow. However, it is understood that any other shape or arrangement can be used within the scope and spirit of the present invention, provided the same goals are reached.

The conical member 3 must be capable of being fixed to a hook 11 or the like attachment. For this purpose, the conical member has a hooking member which consists of a hooking loop 13 the latter being formed of a spoon-shaped metallic thread in which the ends 15, 17 are embedded in the conical member 3, in the manner illustrated in FIGS. 1 to 4 of the drawings. The spoon portion 19 defines the hooking loop itself which is adapted to be engaged over the hook 11 in the mounted position of the drop wire and/or cable clamp 1 as shown in FIG. 3 of the drawings.

Turning now to the conical sleeve 5, the latter will be seen to be provided with an inner longitudinal slot 21 which will enable to sleeve to be engaged over the hooking loop 13 in the particular manner illustrated in FIG. 1 of the drawings, after which the conical sleeve 5 will be mounted over the conical member 3 in the position illustrated in FIGS. 2 and 3 of the drawings.

For ease of operation, and mostly for strength purposes the conical sleeve 5 will be formed with flange portions 23, 25 as illustrated in FIGS. 1 to 4 of the drawings.

Finally, the conical sleeve 5 has a narrow row of small dents which will form a narrow serrated surface 27 on the inner length of the conical sleeve 5. This serrated surface 27 will of course have to be aligned with the outer longitudinal groove 7 of the conical member 3, and the wire 9, when the conical sleeve 5 is mounted over the conical member 3 in clamping engagement over the wire 9.

In the region of the serrated surface 27, the conical sleeve 5 has an inner longitudinal depression 29 also forming an outer longitudinal projection 30 which will be aligned with the outer longitudinal groove 7 of the conical member 3 in the clamped position of the device. In this manner, the wire 9 will be engaged by both the inner and outer longitudinal grooves 29 and 7 when the conical sleeve 5 is mounted over the conical member 3 in clamping engagement of the wire 9. Reference is particularly made to FIG. 5 to the mounted position of the drop wire clamp.

As illustrated in FIGS. 6 and 7, the conical member 9 will preferably be hollow since it will be formed of a metallic sheet which is rolled over itself to abut each ends and is welded at 31 in the manner illustrated in FIGS. 6, 7 and 9. The hollow conical member 3 can also be produced by known methods without any weld therein. In the embodiment illustrated in FIGS. 6 to 7, the grooves 7 and 29 are shaped to engage a round television cable 9. However, in a modification, it is also possible to clamp a substantially flat television cable 9a and in the case, the grooves 7a and 29a will adopt the particular shaped illustrated in FIG. 9 of the drawings.

In the case of the conical member illustrated in FIG. 8 the hooking loop have its ends 15, 17 engaged by alternate pushed in sections 33, 35 formed in the wall of the conical member 3.

Obviously, for matter of convenience, it is also possible to make the hook 37 and the conical member 3 of a single unitary piece and in this case, this item of the invention will have the shape illustrated in FIG. 10 of the drawings.

The operation of the device according to the invention is quite simple and will be obvious to the man of the art. We therefore feel that we should not elaborate. However, we may point out that once the coaxial television cable 9 has been mounted between the box and a building, the next operation consists in providing a predetermined tension in the wire and/or cable between the clamp and the building to which the wire and/or cable is connected at one end and producing a loose portion between the clamp and a box to which the wire and/or cable is connected at the other end. At that point, a hook 11 will be mounted on the pole 39, the conical member will be hooked by means of its hooking portion 19 over the hook 11. Extra feet of cable will be allowed for hook-up.

At that point the conical sleeve will be given a left or right rotation in order to align the slot 21 with the outer longitudinal groove 7. The cable will be aassed through the slot 21 to sit in the groove 7, the conical sleeve will be pushed towards the small end of the conical member to be rotated by half a turn wherein the cable will be received by the inner and outer longitudinal grooves 7 and 29. Thereafter the conical sleeve will be pushed toward the larger end of the conical member thus allowing a pressure to be exerted against the cable.

Thereafter the cable will be pulled thus tightening the assembly, leaving a loose buckle between the box and the clamp.

The other embodiments operate in the same manner and will of course be obvious to the man of the art.

The conical member of the clamp can be hollow or not. All parts can be manufactured of aluminum of any size gauge depending on the size of the wire; it can also be made of steel of any type and/or a combination of plastic-aluminum, plastic-steel or totally plastic.

The conical sleeve and conical member can be cast units, or can be produced in any known manner.

Whenever used throughout this specification and claims the term "to provide a predetermined tension" means to hang a wire or cable between two points and at a distance above the ground and allowing a loose part at one or both ends for connection.

It is obvious that the clamp according to this invention may be used for any other purposes than those described.

For example, it can be used to connect all kinds of wire or cables; two clamps may be used along the same wire or calbe, etc.

I claim:

1. A wedge clamp for securing a cable to a support, said clamp comprising:

an inner member having a generally conical outer surface configuration and a longitudinal groove formed in the outer surface for receiving the cable, the depth of said groove being less than the thickness of the cable to be received therein, and further having a means for securing said inner member to the support; and an outer sleeve mounted over said inner member, said outer sleeve having an inner surface configuration corresponding generally to the conical outer surface configuration of said inner member, said inner surface having a dented portion for receiving said cable, and further having a longitudinal slot of sufficient width for passing into said outer sleeve the cable to be received in said groove;

the inner surface of said outer sleeve slidably engaging the outer surface of said inner member along its longitudinal length in a close fitting relationship, the space between said longitudinal groove and said dented portion of said sleeve constituting a cable securing opening; and said outer sleeve being rotatable around said inner member when said outer sleeve is disengaged from said inner member.

2. A wedge clamp according to claim 1, wherein at least a portion of the surface of said longitudinal groove is formed with slip-preventing serrations for engaging the cable received in said groove.

3. A wedge clamp according to claim 1, wherein the dented portion of the inner surface of said outer sleeve is formed with cable slip-preventing serrations for engaging the cable received in the cable securing opening.

4. A wedge clamp according to claim 3, wherein the dented portion of said surface of said outer sleeve formed with said serrations is diametrically opposite said longitudinal slot.

5. A wedge clamp according to claim 1, wherein the dented portion of said outer sleeve additionally has a longitudinal groove formed for receiving the cable.

6. A wedge clamp according to claim 5, wherein the dented portion of the surface of said groove in said outer sleeve is formed with slip-preventing serrations.

7. A wedge clamp according to claim 5, wherein said groove in said outer sleeve is diametrically opposite said longitudinal slot.

8. A wedge clamp according to claim 5, wherein said groove of said inner member and said groove of said outer sleeve are respectively shaped to receive a round cable in clamping engagement.

9. A wedge clamp according to claim 5, wherein said groove of said inner member and said groove of said outer sleeve are respectively shaped to receive a substantially flat cable in clamping engagement.

10. A wedge clamp according to claim 1, wherein said securing means is a hooking loop.

11. A wedge clamp according to claim 10, wherein said hooking loop is a single unitary piece with said inner member.

12. A wedge clamp according to claim 10, wherein said inner member is hollow and said hooking loop is a metallic wire bent into a loop with the ends thereof crimped in the end of said hollow inner member.

13. A wedge clamp according to claim 10, wherein said inner member is hollow and said hooking loop is a metallic wire bent into a loop with the ends thereof forceably extending through successive openings in the wall of said hollow inner member, said openings being formed by portions of the wall being pressed inwardly.

14. A wedge clamp according to claim 1, wherein said inner member is a cast unit.

15. A wedge clamp according to claim 1, wherein said securing means is attached to the smaller end of said inner member.

16. A wedge clamp according to claim 1, wherein said longitudinal slot of said outer sleeve enables said securing means to pass into said outer sleeve so as to enable said outer sleeve to slidably engage said inner member.

17. A wedge clamp according to claim 1, wherein said outer sleeve is formed with flange portions at both ends thereof.

* * * * *